Dec. 12, 1939.  W. C. JACKSON  2,183,322
HOLDING STRAP FOR ANTISKID DEVICES
Original Filed June 11, 1936  2 Sheets-Sheet 1
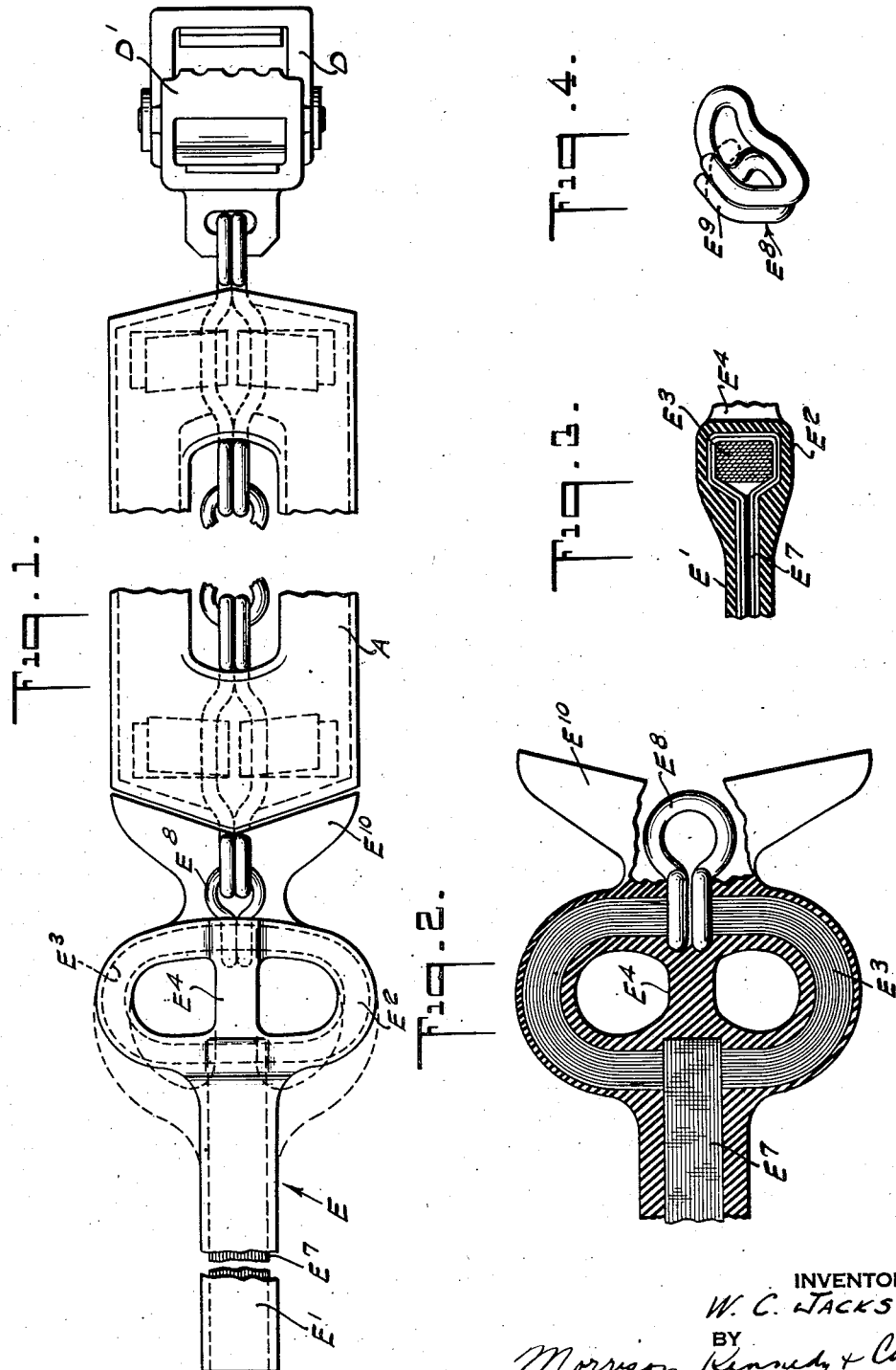
INVENTOR
W. C. JACKSON
BY
Morrison, Kennedy & Campbell
ATTORNEYS Dec. 12, 1939.   W. C. JACKSON   2,183,322
HOLDING STRAP FOR ANTISKID DEVICES
Original Filed June 11, 1936   2 Sheets-Sheet 2
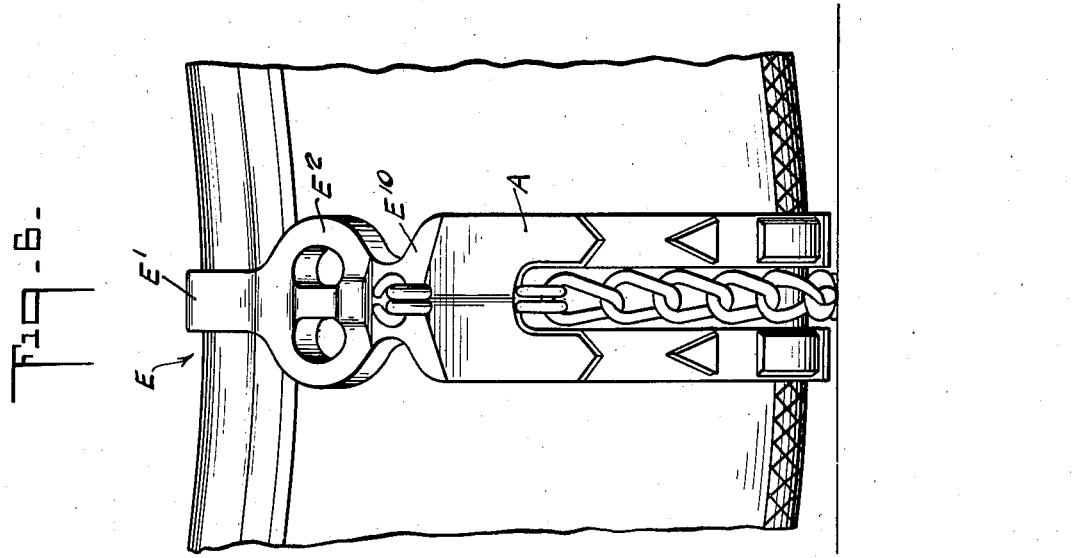
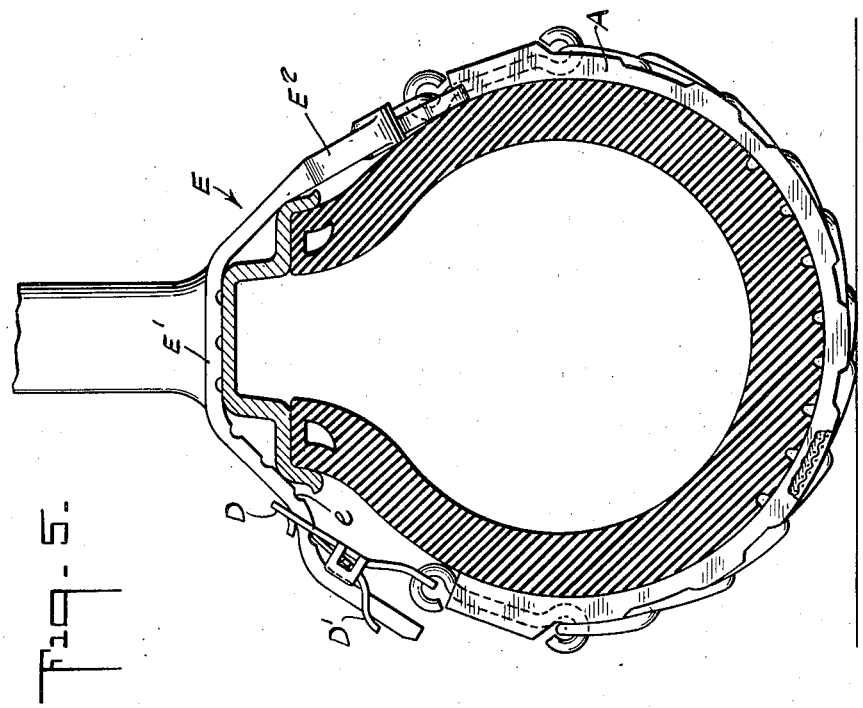
INVENTOR
W. C. JACKSON.
BY
Morrison, Kennedy & Campbell
ATTORNEYS Patented Dec. 12, 1939

2,183,322

UNITED STATES PATENT OFFICE 2,183,322

HOLDING STRAP FOR ANTISKID DEVICES

Walter C. Jackson, Rahway, N. J., assignor to Tingley Reliance Rubber Corporation, a corporation of New Jersey Original application June 11, 1936, Serial No. 84,625. Divided and this application January 22, 1937, Serial No. 121,793

7 Claims. (Cl. 152—218)

This invention relates to holding straps for use with antiskid devices adapted to be applied to an automobile tire, and which will facilitate the attachment of such devices to the tire quickly and readily in case of an emergency. This application is a division of my copending application, Serial No. 84,625, filed June 11, 1936.

The holding strip which embodies the instant improvement is adapted to be attached at one end to the antiskid device and extend around the felly of the wheel for cooperation with a buckle secured at the other end of the antiskid device. The strap has a certain degree of resiliency or elasticity in order that the antiskid device may be pulled up tightly into contact with the tire and yet yield sufficiently to conform to changes in tire contour, as well as absorb the shock incident to the antiskid device striking the road during service. In accordance with the invention, the strap, which incidentally is made of molded rubber in the preferred embodiment, is formed with a loop capable of deforming under load and returning immediately to its original form when the load is removed, this construction imparting the necessary degree of elasticity or resiliency to the strap without detracting in any wise from its strength. Durability in the strap and loop is provided by reinforcing these members with plies of fabric molded into the rubber during manufacture.

Referring to the drawings:

Fig. 1 is a plan view of an antiskid device, together with a strap for holding the device in place and which embodies the present improvements;

Fig. 2 is a horizontal sectional view through a portion of the holding strap;

Fig. 3 is a vertical sectional view on line 3—3 of Fig. 2;

Fig. 4 is a perspective view of an eye member associated with the holding strap and by which it is connected to one end of the antiskid device;

Fig. 5 is a sectional view through a tire and the felly of its associated wheel, and illustrating the manner in which the strap operates in service to secure the antiskid device to the wheel; and Fig. 6 is a side view of a portion of a tire and wheel, and likewise illustrating the manner in which the strap operates in service to secure the antiskid device to the wheel.

In Figs. 1, 5 and 6, there is shown an antiskid device A, which may be of any suitable character, but preferably similar to that shown in my copending application, previously alluded to, and which has secured at one end a strap E adapted to pass around the felly of the wheel and cooperate with a buckle D secured at the other end of the antiskid device for securing the same in place. The strap E is formed with a straight portion $E^1$ for cooperating with the buckle D and a looped portion $E^2$ which deforms under load (as indicated by the dotted lines in Fig. 1), but returns instantly to its original form when the load is removed, thus providing a degree of elasticity or resiliency sufficient to conform to changes in tire cross section, as well as absorb the shock resulting from the continuous pounding of the antiskid device on the road.

The loop $E^2$ and strap $E^1$ are formed of molded rubber and as an integral member. In the embodiment illustrated, the loop $E^2$ is reinforced by a strip of fabric wound spirally to form a plurality of plies $E^3$ and, if desired, the rubber may be extended across the loop, as at $E^4$, in the direction of pull, in order to give additional strength and elasticity at this point, although this is not absolutely necessary, since the tendency of the molded loop itself to return to its original unstressed shape will provide a degree of elasticity suitable for most practical purposes.

The straight portion $E^1$ of the strap is likewise reinforced throughout its length by a series of plies of fabric $E^7$ looped around the plies $E^3$ of which the loop $E^2$ is composed (see Figs. 2 and 3). The fabric in the loop, as well as in the straight portion of the strap, is frictioned before vulcanization, it being noted that the layer of rubber between the two inner plies in the straight portion of the strap is relatively thick to obviate any tendency of the plies to separate in this region.

In order to connect the holding strap E to the link at the end of the antiskid device, there is provided an eye $E^8$ protruding from the loop $E^2$ diametrically opposite the straight portion $E^1$ and which is securely connected to the loop by portions $E^9$ bent around the plies $E^3$ therein before the application of the outside layer of rubber and its subsequent vulcanization. This eye is illustrated in detail in Fig. 4, the shape of the ends before bending in place being shown in solid lines, and the final shape of the ends after having been bent around the plies $E^3$ being shown in dotted lines. As an expediency to protect the tire from the metal eye $E^8$, the strap may be molded with a flat portion of rubber $E^{10}$ extending beneath the eye and which in service is located between the eye and the tire. This flat portion also serves to prevent the eye $E^8$ from working loose by rotation around the plies $E^3$.

The fabric which forms part of the strap, both in the straight portion, as well as in the loop portion, is the usual cord fabric ordinarily used in tire manufacture. There are comparatively few pick threads per inch in this fabric and the warp cords are arranged lengthwise of the strips. This construction permits the straight portion of the strap to be thoroughly flexible and thus facilitate its application. Although the loop $E^2$, as shown, is oval in shape, this is merely an expedient due to lack of room near the felly of the wheel. Actually, the loop would perform its function in the same manner if it were round or of any other suitable configuration.

In applying the antiskid device to the wheel, the strap is passed around the felly thereof and through the buckle, whereupon it is pulled up tightly to bring the antiskid device into close contact with the surface of the tire (see Figs. 5 and 6). The buckle is provided with a hinged member $D^1$, one edge of which is adapted to cooperate with one or another of a plurality of notches $e$ formed in the felly contacting surface of the strap, and thus hold the device firmly on the wheel without slippage.

From what has been said, it is apparent that the invention provides a strap which will permit the desired degree of tension to be imparted to the antiskid device itself, but which will yield in service so as to absorb the shocks incident to the striking of the antiskid device on the road without any danger of breakage to the strap itself. Furthermore, it allows the antiskid device to be applied to the wheel with little trouble and can be manufactured at very little cost.

In the accompanying drawings, the invention has been shown merely by way of example and in preferred form, and obviously many variations and modifications may be made therein which will still be comprised within its spirit. It is to be understood, therefore, that the invention is not limited to any specific form or embodiment, except insofar as such limitations are specified in the appended claims.

Having thus described my invention, what I claim is:

1. A strap adapted to secure an antiskid device to the felly of a wheel, said strap including as an integral part thereof a molded loop member distortable out of its original loop form under load and returnable into its original loop form when the load is removed, said member being connected in the strap in such manner that tension applied to the strap in service tends to produce such distortion against the tendency of the loop to resist the same, whereby the strap in effect has elasticity in a lengthwise direction.

2. A strap adapted to secure an antiskid device to the felly of a wheel, said strap including as an integral part thereof a molded closed loop member distortable out of its original loop form under load and returnable into its original loop form when the load is removed, said member being connected in the strap in such manner that tension applied to the strap in service tends to produce such distortion against the tendency of the loop to resist the same, whereby the strap in effect has elasticity in a lengthwise direction.

3. A strap adapted to secure an antiskid device to the felly of a wheel, said strap including as an integral part thereof a molded rubber fabric-reinforced loop member distortable out of its original loop form under load and returnable into its original loop form when the load is removed, said member being connected in the strap in such manner that tension applied to the strap in service tends to produce such distortion against the tendency of the loop to resist the same, whereby the strap in effect has elasticity in a lengthwise direction.

4. A strap according to claim 1, wherein the strap and loop member are formed each of molded rubber with a plurality of fabric plies embedded therein, the plies of one portion being connected with those of the other portion.

5. A strap according to claim 1, wherein the strap and loop portion are formed of molded rubber reinforced with plies of fabric embedded therein, the plies of fabric in one portion of the strap being looped around those of the other portion.

6. A strap according to claim 1, wherein the loop member is formed with a resilient transverse element connecting opposite portions thereof.

7. A strap according to claim 1, wherein there is a straight end portion formed integral with the loop portion and wherein also the loop member is formed with a resilient transverse element connecting opposite portions thereof, and arranged in alignment with the straight end portion of the strap.

WALTER C. JACKSON.